(12) United States Patent
Wu et al.

(10) Patent No.: US 11,153,063 B2
(45) Date of Patent: Oct. 19, 2021

(54) MANAGING BIDIRECTIONAL COMMUNICATION IN CONSTRAINED ENVIRONMENTS

(71) Applicant: Marvell Asia Pte, Ltd., Singapore (SG)

(72) Inventors: Dance Wu, Palo Alto, CA (US); Christopher Mash, Harpenden (GB)

(73) Assignee: Marvell Asia Pte, Ltd., Singapore (SG)

(*) Notice: Subject to any disclaimer, the term of this patent is extended or adjusted under 35 U.S.C. 154(b) by 66 days.

(21) Appl. No.: 16/815,299

(22) Filed: Mar. 11, 2020

(65) Prior Publication Data

US 2020/0295911 A1   Sep. 17, 2020

(51) Int. Cl.
| | |
|---|---|
| *H04B 3/20* | (2006.01) |
| *H04L 5/14* | (2006.01) |
| *H04W 76/27* | (2018.01) |
| *H04J 14/02* | (2006.01) |
| *H04L 7/04* | (2006.01) |
| *H04W 72/04* | (2009.01) |

(52) U.S. Cl.
CPC ........ *H04L 5/1461* (2013.01); *H04J 14/0226* (2013.01); *H04J 14/0247* (2013.01); *H04J 14/0282* (2013.01); *H04L 7/04* (2013.01); *H04W 72/0446* (2013.01); *H04W 76/27* (2018.02)

(58) Field of Classification Search
None
See application file for complete search history.

(56) References Cited

U.S. PATENT DOCUMENTS

| | | | |
|---|---|---|---|
| 10,256,941 B1 | 4/2019 | Lo | |
| 10,530,559 B2 | 1/2020 | Wu | |
| 2012/0002662 A1* | 1/2012 | Wan | H04W 72/082 370/345 |
| 2013/0107765 A1* | 5/2013 | He | H04B 1/30 370/280 |
| 2014/0269353 A1* | 9/2014 | Yang | H04W 24/10 370/252 |
| 2019/0313406 A1* | 10/2019 | Liu | H04W 72/1268 |

* cited by examiner

*Primary Examiner* — Brandon M Renner
(74) *Attorney, Agent, or Firm* — Young Basile Hanlon & MacFarlane, P.C.

(57) ABSTRACT

Bidirectionally transmitting data between a first transceiver and a second transceiver over a transmission line includes communicating between the first transceiver and the second transceiver during a bidirectional communication phase within time slots. The time slots include: a plurality of upstream time slots in which the first transceiver transmits data to the second transceiver, a plurality of downstream time slots in which second transceiver transmits data to the first transceiver, wherein the downstream time slots are shorter than the upstream time slots, and a plurality of idle time slots separating adjacent upstream and downstream time slots.

27 Claims, 4 Drawing Sheets

MANAGING BIDIRECTIONAL COMMUNICATION IN CONSTRAINED ENVIRONMENTS

CROSS-REFERENCE TO RELATED APPLICATION(S)

This application claims priority to and the benefit of U.S. Provisional Application Patent Ser. No. 62/816,767, filed on Mar. 11, 2019, the entire disclosure of which is hereby incorporated by reference.

TECHNICAL FIELD

This disclosure relates to managing bidirectional communication in constrained environments.

BACKGROUND

Communications over wired media can be defined based on standardized protocols. One family of such protocols is Ethernet, as defined by the IEEE 802.3 working group. These standards cover aspects of the Physical (PHY) layer (also known as "layer 1") associated with the physical communication medium, and medium access control (MAC) layer, which is a sublayer of the data link layer (also known as "layer 2") below the logical link control (LLC) sublayer. Various versions of the Ethernet standard are designed to operate at different speeds, and to use different types of physical communication media. For example, some versions of Ethernet that operate at 100 MBits per second (called "100BASE-TX") are designed for use with a cable that includes separate twisted pair transmission lines for each direction (upstream and downstream). Some versions Ethernet that operate at 1 Gbit per second (called "1000BASE-T1") are designed for use with a single twisted pair transmission line used for both upstream and downstream directions, using echo cancellation to mitigate the impact of reflections on the transmission line for optimization of the available bandwidth, which is shared equally for upstream and downstream directions.

The description above is presented as a general background relevant to this technical field and should not be construed as an admission that any of the information it contains constitutes prior art against the present patent application.

SUMMARY

In one aspect, in general, a networking system for bidirectionally transmitting data comprises: a communication medium comprising a transmission line having a first end and a second end; a first node comprising a first transceiver coupled to the transmission line in proximity to the first end through a first bidirectional interface that is configured to transmit electromagnetic signals to the transmission line and receive electromagnetic signals from the transmission line during a bidirectional communication phase; and a second node comprising a second transceiver coupled to the transmission line in proximity to the second end through a second bidirectional interface that is configured to transmit electromagnetic signals to the transmission line and receive electromagnetic signals from the transmission line during the bidirectional communication phase. The first node and the second node are configured to communicate during the bidirectional communication phase within time slots that include: a plurality of upstream time slots in which the first transceiver transmits data to the second transceiver, a plurality of downstream time slots in which second transceiver transmits data to the first transceiver, wherein the downstream time slots are shorter than the upstream time slots, and a plurality of idle time slots separating adjacent upstream and downstream time slots.

Aspects can include one or more of the following features.

The first node further comprises: a port configured to provide collected data from a sensor, and a first medium access controller configured to control timing of access by the first transceiver to the transmission line during the bidirectional communication phase; and the second node further comprises a second medium access controller configured to control timing of access by the second transceiver to the transmission line during the bidirectional communication phase.

The networking system further comprises the sensor, in communication with the port of the first node, and configured to collect at least a portion of the collected data during the bidirectional communication phase.

During a plurality of the upstream time slots, the first transceiver transmits data that includes at least some of the collected data to the second transceiver.

The first and second medium access controllers are configured to provide a minimum duration of the idle time slots is based at least in part on a termination characteristic of the transmission line.

The first end is terminated with an impedance configured to reduce reflections from the first end by at least 80%, and the second end is terminated with an impedance configured to reduce reflections from the second end by at least 80%.

The first and second medium access controllers are configured to provide the minimum duration to be long enough for a reflection from the first end or second end to propagate over a round trip between the first end and second end at least twice.

The first medium access controller and the second medium access controller are configured to exchange information by the first transceiver and the second transceiver, respectively, during a setup phase, and the setup phase includes transmitting between the second node and the first node a value indicating at least one of: a selected time duration of the upstream time slots or the downstream time slots, or a selected time slot ratio between the upstream time slots and the downstream time slots.

The first node includes a first timing module configured to provide a first timing signal for determining time slots in which to transmit and receive using the first transceiver, and the second node includes a second timing module configured to provide a second timing signal for determining time slots in which to transmit and receive using the second transceiver.

The first node and the second node are configured to synchronize the first timing module to the second timing module during the setup phase.

The second node further comprises a communication port that is in communication with a computing device configured to process at least a portion of the collected data.

The second node comprises a networking switch configured to route at least a portion of the collected data to the computing device.

The first medium access controller and the second medium access controller are configured to provide a communication session in which all downstream time slots have the same duration, and all the upstream time slots have the same duration.

A vehicle includes the networking system configured to transmit data between devices disposed in different portions of the vehicle.

In another aspect, in general, a method is used for bidirectionally transmitting data between a first transceiver and a second transceiver over a transmission line through respective bidirectional interfaces that transmit electromagnetic signals to the transmission line and receive electromagnetic signals from the transmission line. The method comprises: communicating between the first transceiver and the second transceiver during a setup phase in which information is exchanged between the first transceiver and the second transceiver, the information including a value indicating at least one of: a selected time duration of upstream time slots or downstream time slots, or a selected time slot ratio between upstream time slots and downstream time slots; and communicating between the first transceiver and the second transceiver during a bidirectional communication phase within time slots determined according to the value. The time slots include: a plurality of upstream time slots in which the first transceiver transmits data to the second transceiver, a plurality of downstream time slots in which second transceiver transmits data to the first transceiver, wherein the downstream time slots are shorter than the upstream time slots, and a plurality of idle time slots separating adjacent upstream and downstream time slots.

Aspects can include one or more of the following features.

The method further comprises receiving collected data through a port of a first node that includes the first transceiver.

The method further comprises, during a plurality of the upstream time slots, transmitting data that includes at least some of the collected data from the first transceiver to the second transceiver.

Communicating between the first transceiver and the second transceiver during the bidirectional communication phase includes waiting during the idle time slots for a minimum duration of the idle time slots that is long enough for a reflection from a first end or second end of the transmission line to propagate over a round trip between the first end and the second end at least twice.

The method further comprises, during the setup phase, synchronizing a first timing signal for determining time slots in which to transmit and receive using the first transceiver, and a second timing signal for determining time slots in which to transmit and receive using the second transceiver.

The synchronizing comprises locking the second timing signal to the first timing signal.

Aspects can have one or more of the following advantages.

Ethernet is an example of a form of communication that can operate in constrained environments, such as an automotive environment, in which certain operating requirements (e.g., electromagnetic noise requirements, and/or temperature requirements) must be met, and certain physical constraints (e.g., cable length) can be assumed. However, some previous Ethernet protocols have had characteristics that present challenges to achieving greater optimization in some constrained environments. Some implementations of various techniques described herein are able to mitigate some or all of these potential challenges, examples of which are described below.

Some Ethernet protocols are configured to operate using separate communication media (e.g., separate transmission lines) for upstream and downstream communication in a point-to-point link. However, in an environment such as an automobile, the extra weight that would result from doubling the number of transmission lines for every link could be detrimental to satisfying weight constraints. For example, the combined weight of cables used for hundreds of nodes within an automobile may be on the order of a hundred kilograms or more. Some implementations described herein use a shared communication medium between nodes on either end of a link.

Some Ethernet protocols are configured to operate using a symmetrical link that divides the available bandwidth on a shared communication medium (e.g., a point-to-point transmission line) evenly. In an environment such as an automobile, there may be some nodes (e.g., sensor nodes, or nodes sending sensor data upstream from sensor nodes) that have a much larger volume of data to transmit than other nodes (e.g., control nodes, or nodes sending control information downstream from control nodes). In conventional Ethernet systems, components are configured to offer balanced bandwidth capacity in both upstream and downstream directions. Because networking systems are designed to accommodate the requirements of the direction in which greater capacity is needed, there typically is unused bandwidth capacity in the other direction.

In the current disclosure a system is described which departs from typical balanced bandwidth capacity designs and instead provides the option of establishing an uneven (or "asymmetrical") division of the total available bandwidth. In some implementations, this uneven division can be facilitated by communication during a setup phase that allows one of the nodes to send the other node information indicating how the bandwidth will be divided, as described in more detail below.

Some Ethernet protocols are configured to divide bandwidth over a shared communication medium between nodes on either end of a point-to-point link using time division multiplexing. In such protocols, echo cancellation typically is used to allow the alternating time slots for upstream and downstream communication to be close together without being distorted by echoes from reflections between the ends of a transmission line that are not terminated by a perfectly impedance matched load. However, in an environment such as an automobile, the extra weight, cost, power consumption, and/or complexity that would result from using such echo cancelation circuitry may be detrimental. Instead of echo cancellation, some implementations incorporate idle time slots between active time slots to allow reflections to propagate between the ends enough times to fall to low enough amplitudes to avoid significant distortion. The constrained size of an automotive environment ensures that the time needed for the reflections to travel the necessary multiples of the round trip distance, and the resulting idle time slots, are small enough to consume a relatively small amount of the available bandwidth.

In some cases, echo cancellation calls for allowing enough margin in communication circuitry for signal strengths to double (e.g., a 1-V signal and its reflection adding to 2 V on the transmission line). By avoiding the need for echo cancellation, another advantage may be the ability to use the extra signal strength margin for increasing the standard signal amplitude (e.g., 1.5 V instead of 1.0 V). This additional signal strength can be a significant improvement in an environment such as an automobile that may have a significant level of electromagnetic noise.

Other features and advantages will become apparent from the following description, and from the figures and claims.

BRIEF DESCRIPTION OF THE DRAWINGS

The disclosure is best understood from the following detailed description when read in conjunction with the accompanying drawings. It is noted that, according to common practice, the various features of the drawings are not to-scale. On the contrary, the dimensions of the various features are arbitrarily expanded or reduced for clarity.

DETAILED DESCRIPTION

Figure 1:
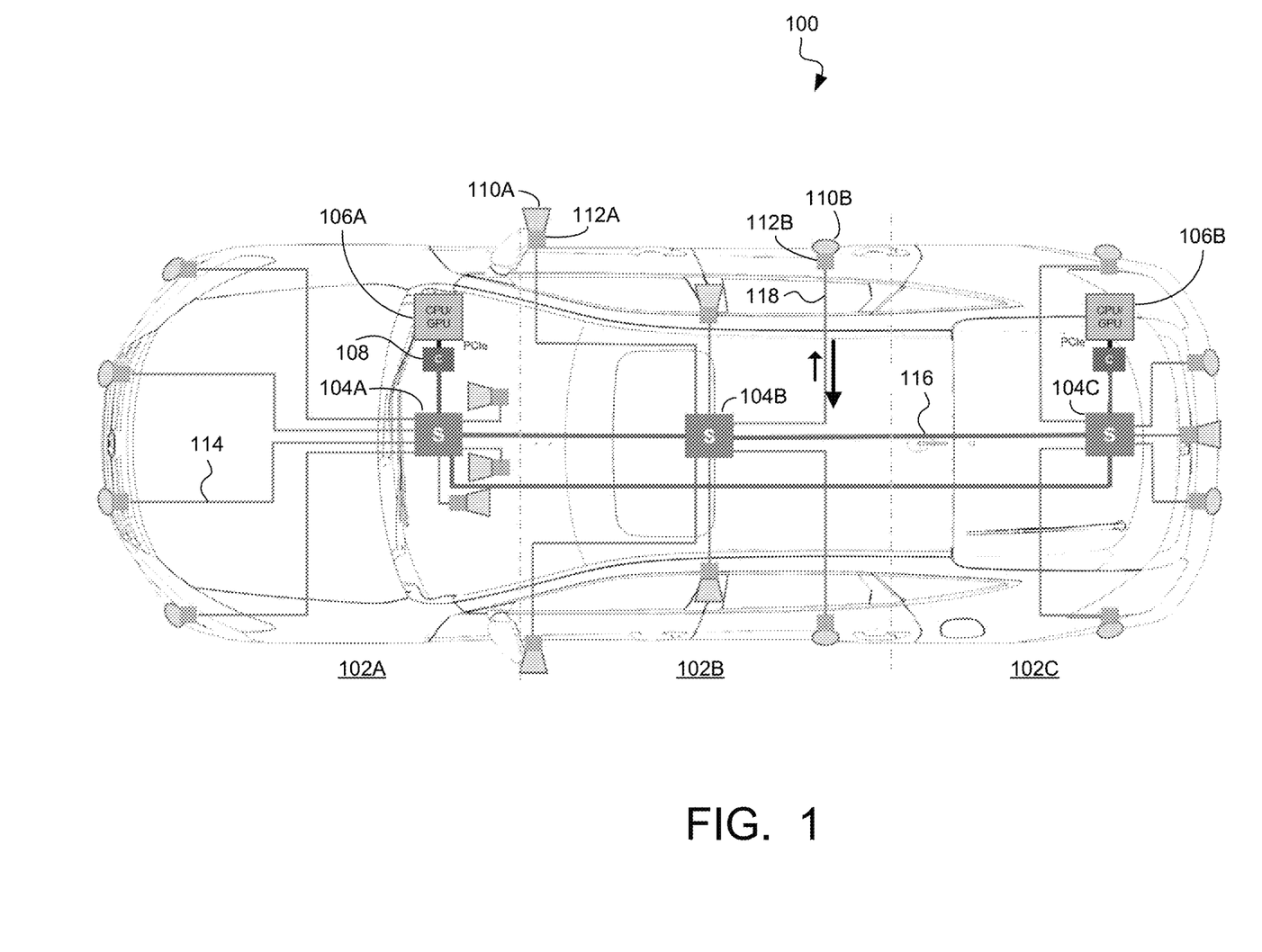
FIG. 1 is a schematic diagram of an example vehicle.

FIG. 1 is pictorial diagram showing an example of vehicle 100 in which various aspects, features, and elements described herein are implemented in accordance with an embodiment of this disclosure. The vehicle 100 includes a communications network (or simply "network") that enables communication among different subsystems in the vehicle 100. The network may have any of a variety of network topologies. In some implementations, some nodes can be connected over a shared communication medium, such as a bus, to which different nodes are connected. In some implementations, certain nodes (e.g., sensor nodes) are connected to other nodes (e.g., a switch node) over a point-to-point link. In the example of FIG. 1, the network includes multiple network segments configured to provide for communication and control over multiple zones within the vehicle 100. A front zone network segment 102A includes a switch 104A that serves as a gateway to the network segment 102A, a middle zone network segment 102B includes a switch 104B that serves as a gateway to the network segment 102B, and a back zone network segment 102C includes a switch 104C that serves as a gateway to the network segment 102C. In this example, the front zone network segment 102A and the back zone network segment 102C include respective control modules 106A and 106B that provide control functionality for various subsystems in the vehicle 100 over the network. For example, the control module 106A is connected to a network controller 108 that couples the control module 106A to the network through the switch 104A. The network controller 108 is configured to communicate using a communication protocol (e.g., an Ethernet type protocol), as described in more detail below. In this example, the middle zone network segment 102B is configured to enable communication with various sensor devices, but does not include a dedicated control module.

The control modules can be implemented, for example, using a system-on-a-chip (SoC) or other electronic circuitry that includes one or more processor cores. A given processor core can be configured as a generalized unit such as a central processing unit (CPU), a special purpose unit such as a graphics processing unit (GPU), and/or other form of processing circuitry. For example, the control modules can be implemented using one or more special purpose processors, one or more digital signal processors, one or more microprocessors, one or more controllers, one or more microcontrollers, one or more integrated circuits, one or more Application Specific Integrated Circuits (ASICs), one or more Field Programmable Gate Arrays, one or more programmable logic arrays, one or more programmable logic controllers, one or more state machines, or any combination thereof. The control modules can execute programs based on stored code, including code stored in storage module comprising any tangible non-transitory computer-usable or computer-readable medium, capable of, for example, containing, storing, communicating, or transporting machine readable instructions, or any information associated therewith, for use by or in connection with the control module. For example, the storage module can include any form of volatile or non-volatile memory including one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

Examples of the kind of sensor devices that can be included, in any of the zones of the vehicle, include an imaging/navigation sensor 110A (e.g., video camera, radar, LiDAR, rangefinders or other proximity sensors, velocity sensors, accelerometers, infrared-sensing, acoustic-sensing (including ultrasonic sensors), GPS, etc.), and an environmental/user-interface sensor 110B (e.g., mass air flow, engine speed, acceleration, braking, traction, oxygen, fuel temperature, pressure, voltage, steering wheel position, seating position, eye tracking, etc.). The imaging/navigation sensor 110A provides data to the network through a communication bridge 112A, and the environmental/user-interface sensor 110B provides data to the network through a communication bridge 112B. These communication bridges can be configured according to a communication protocol to facilitate transmission of potentially large amounts of sensor data to one or both of the control modules, as described in more detail below. While this example shows some sensors connected to one of the control modules through two or more point-to-point links via one or more switches, other sensors can be connected to a control module over a single point-to-point link without going through any intervening switches, which may be used for "edge processing" that avoids moving large amount of data across the vehicle network, potentially reducing network congestion.

There are typically a large number of subsystems of the vehicle that can also be configured to provide data to, and/or be controlled by, one or more of the control modules. For example, some of these subsystems may be associated with the vehicle's chassis, wheels, or powertrain (e.g., including a power source, suspension, drive shaft, axles, and exhaust system). The power source, such as an internal combustion engine, an electric motor, or a combination of an internal combustion engine and an electric motor, may be operative to provide kinetic energy as a motive force to one or more of the wheels. There may also be a large number of driver controls (e.g., for power-up/ignition, steering, acceleration, and braking) and displays, or other user interface input and output elements, that are in communication with the network. Also, alternative types of vehicles, other than automobiles, can include other subsystems including subsystems for other types of propulsion, such as a propellers for aerial vehicles. Any of a variety of modules of these subsystems can be electronically controllable modules that are controlled, at least in part, based on signals sent to or from one or more of the control modules. Communication nodes associated with these subsystems in different network segments communicate with other subsystems, such as the powertrain, the wheels, or both, for example, to control the vehicle 100, such as accelerating, decelerating, steering, or otherwise controlling the vehicle 100.

There may be various types of communication media that connect different nodes of the network. The switches and communication bridges can be interconnected by cables for transmitting encoded signals (e.g., signals encoded using amplitude and/or phase of a transmitted wave according to a suitable protocol). In some cases, there may be different types of cables between different types of nodes, some of which may have different physical characteristics such as length, bandwidth capacity, and/or shielding materials. For example, one type of cable 114 may be used between a sensor bridge and a switch, and another type of cable 116 may be used between different switches. The cables can include one or more communication media such as electrical wiring and/or optical fiber. The switches and communication bridges can be configured to include circuitry for providing appropriate functionality according to particular communication protocols in a layered protocol stack. For example, a PHY layer protocol can be used by a transceiver that includes circuitry for transmitting signals onto a communication medium and circuitry for receiving signals from the communication medium. In some implementations, there is separate transmitter circuitry and receiver circuitry, and circuitry to control whether the transmitter or receiver is actively accessing the communication medium. A MAC layer can be used by a medium access controller that controls access by the transceiver to the communication medium. Medium access controllers, and/or other circuitry controlling timing of the transceivers (e.g., circuitry in either or both of the MAC layer and/or PHY layer), are able to configure link 118 between the switch 104B and the communication bridge 112B to provide an uneven division of the available bandwidth for large quantities of sensor data to efficiently flow upstream. Other types of cables can also be included in the vehicle 100, such as cables for delivering electrical power. For example, the control switches, control modules, and sensors can be configured to receive power from the powertrain over a power delivery network.

Figure 2:
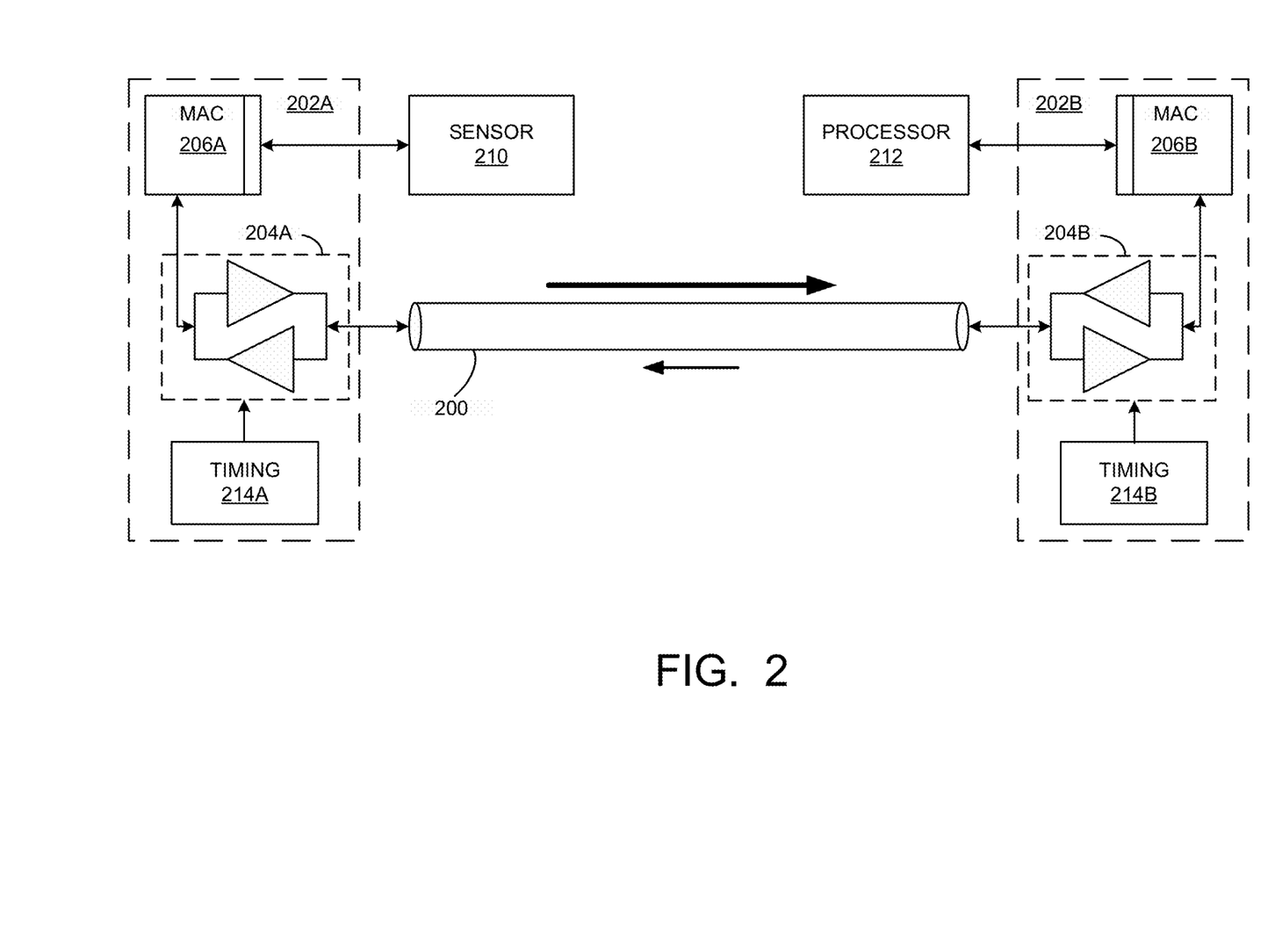
FIG. 2 is a schematic diagram of an example communication link in a communications network in the vehicle.

FIG. 2 is a schematic showing an example of a communication link between two nodes of a network in a constrained environment such as the vehicle 100 of FIG. 1. An electrical transmission line 200 (e.g., a twisted pair including two conducting wires surrounded by insulating material twisted together) provides a shared point-to-point connection between a downstream node 202A and an upstream node 202B. The downstream node 202A includes a transceiver 204A coupled to the end of (or in proximity to the end of) the transmission line 200, and the upstream node 202B includes a transceiver 204B coupled to the end of (or in proximity to the end of) the transmission line 200. Each transceiver includes a bidirectional interface that includes transmitter circuitry configured to transmit electromagnetic signals (e.g., voltage signals) to the transmission line 200, and receiver circuitry configured to receive electromagnetic signals from the transmission line 200. The transceivers and interface circuitry coupling the transceivers to the transmission line 200, are in some implementations, integrated within a PHY device configured to conform to a physical layer standard. The downstream node 202A includes a medium access controller 206A configured to control the transceiver 204A, and the upstream node 202B includes a medium access controller 206B configured to control the transceiver 204B. In this example, the downstream node 202A is in communication with a sensor 210, either directly over a bridge or indirectly over one or more additional links through one or more switches; and the upstream node 202B is in communication with a processor 212 (such as a processor in a control module), either directly through a network controller or indirectly over one or more additional links through one or more switches.

Figure 3:
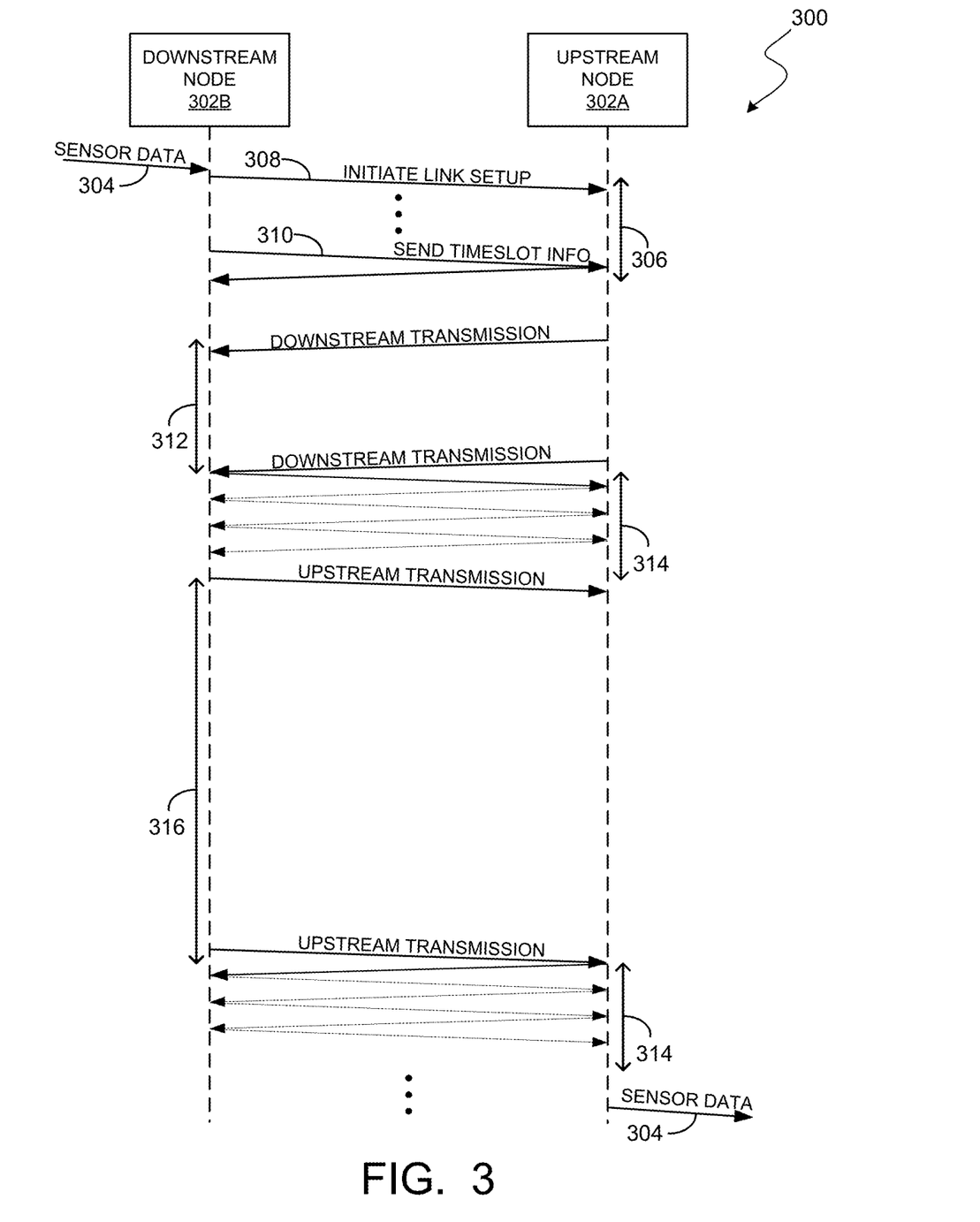
FIG. 3 is a plot of an example communication pattern between an upstream and downstream node in the communications network.

Due to the quantity of data that is collected by the sensors and the speed at which that data needs to arrive at an upstream node in the network, such as a control module or processor, it is useful for at least some of the links in the network to be configured to provide a significantly larger share of the available bandwidth for the upstream direction, and a smaller share in the downstream direction. So, the protocol used by the nodes 202A and 202B can be designed to provide a larger share of the bandwidth from the downstream node 202A to the upstream node 202B, as shown. FIG. 3 is a ladder diagram showing an example of a communication pattern 300 between an upstream node 302A and downstream node 302B. Sensor data 304 is received at the downstream node, such as a sensor device, and may be temporarily stored or buffered in a storage device (e.g., volatile and/or non-volatile memory) as it is sent upstream, or streamed directly without requiring storage of any significant amount of the sensor data 304. In some cases a sensor device is collecting at least a portion of the sensor data 304 during bidirectional communication in which that sensor data is being sent upstream in an efficient manner (e.g., without wasting bandwidth that would otherwise be unused).

After the downstream node 302B receives sensor data 304, there is a link setup phase, which in this example occurs over an initial time period 306. The downstream node 302B initiates (308) the link setup in this example, but in other examples the upstream node 302A may initiate the link setup. In some implementations, the nodes are configured with one node (e.g., the downstream node) acting as a "master" node and another node (the upstream node) acting as a "slave" node, where the master node initiates link setup. The setup phase may proceed according to a "handshake" protocol in which various characteristics of the link are established. In this example, those characteristics include the durations of a set of alternating downstream and upstream time slots. Time slot information 310 includes a value indicating a selected time duration of the upstream time slots and the downstream time slots. Alternatively, one of the time slot durations (e.g., the longer upstream time slot) can be predetermined and the other time slot duration (e.g., the shorter downstream time slot duration) can be determined by the master node and sent to the slave node. Alternatively, the master node can determine and send a selected time slot ratio between the upstream time slots and the downstream time slots. The ratio can be configurable to allow different levels of bandwidth sharing in different cases (e.g., 2:1, 50:1, 100:1, 1000:1, etc.), including an even split of the bandwidth (i.e., a 1:1 time slot ratio) in some cases. The ratio may be different for different links, and/or may change for different sessions over the same link.

Other link configuration can be performed during the setup phase. For example, the master node can send the slave node a signal encoded with a training sequence. Also, the nodes can perform a synchronization procedure to synchronize a timing module at one node to a timing module at the other node. For example, the slave node can perform a procedure to lock a timing signal of a slave timing module 214B (e.g., a clock used by the transceiver 204B) to timing signal of a master timing module 214A (e.g., a clock used by the transceiver 204A). The locking of a clock can include locking a frequency of the clock. In some implementations, the setup phase includes minimal activity (e.g., reducing the number of acknowledgement messages or other unnecessary communication) in order to reduce the latency of communication within the vehicle enabling quick responses for safety reasons.

In this example, the time over which the link is active is divided into three kinds of time slots. A downstream time slot 312 has a long enough duration to provide sufficient bandwidth for command and control information to be sent from a control module. An upstream time slot 316 has a long enough duration to reserve a significant share of the bandwidth for sending sensor data from a sensor device (e.g., in some cases more than 90% of the bandwidth, or more than 99% of the bandwidth). In some implementations, the upstream bandwidth is 10 Gbps and the downstream bandwidth is 100 Mbps. The downstream and upstream time slots alternate, with an idle time slot 314 between each of the different types of time slots. The sensor data 304 can be sent from the upstream node 202B to the processor 212, possibly via one or more additional links over the network, after each upstream time slot, or can buffer the sensor data 304 to be sent after the session is over or after a predetermined number of time slots or predetermined amount of time.

A purpose for the idle time slot 314 is to allow enough time for reflections from imperfectly terminated ends of the transmission line 200 to attenuate to low enough amplitudes. In some other systems, reflections are dealt with in other ways, such as by performing echo cancellation at the interfaces between the transceivers and the transmission line. But, the additional complexity, cost, and weight that would be called for to implement echo cancellation may not be appropriate in some systems. Allowing enough time for reflections to fade away is not always practical for a communication protocol that is designed to be used in a variety of environments. But, if certain constraints on the environment are assumed in advance, such as a maximum length requirement on the transmission line (e.g., less than 50 meters, or less than or equal to 15 meters), then a communication protocol can be optimized for such a size-constrained environment.

Signal distortions can be caused when communicating on a transmission line due to reflections (also called "echoes") from imperfectly terminated ends of the transmission line. For example, a node may have an interface of a transceiver or other physical layer component that is connected to an end of a transmission line characterized by a certain impedance. When that impedance is substantially equal to the characteristic impedance of the transmission line, then that end of the transmission line is said to be "impedance matched." With an impedance matched termination of a transmission line, there is little or no power reflected from a signal that reaches that end of the transmission line. If one or both ends of the transmission line are not perfectly impedance matched, then there will be a reflection that propagates in the opposite direction to the other end of the transmission line. Echo cancelers are designed to subtract such reflections using additional circuitry at the interface.

For implementations without an echo canceler (e.g., for reasons discussed above), it is still possible to avoid distortion caused by reflections by enforcing a sufficiently long idle time slot between upstream and downstream time slots. For example, if each round trip (i.e., reflection from both ends of the transmission line) reduces the power in a signal to 10% of its power before that round trip, then 3 round trips would yield a power reduction to 0.1%. This level of power reduction can be achieved in some protocols designed to work in a size-constrained environment that assume a transmission line length of 15 m or less with an idle time slot long enough for 3 round trips of 30 m. At an assumed transmission line propagation time of about 5 ns/m (slightly larger than the approximately 3.3 ns/m propagation time of light in a vacuum), the idle time slot should be at least around 450 ns. So, the protocol may allow for the idle time slot 314 to be around 0.5-1.0 microseconds.

Figure 4:
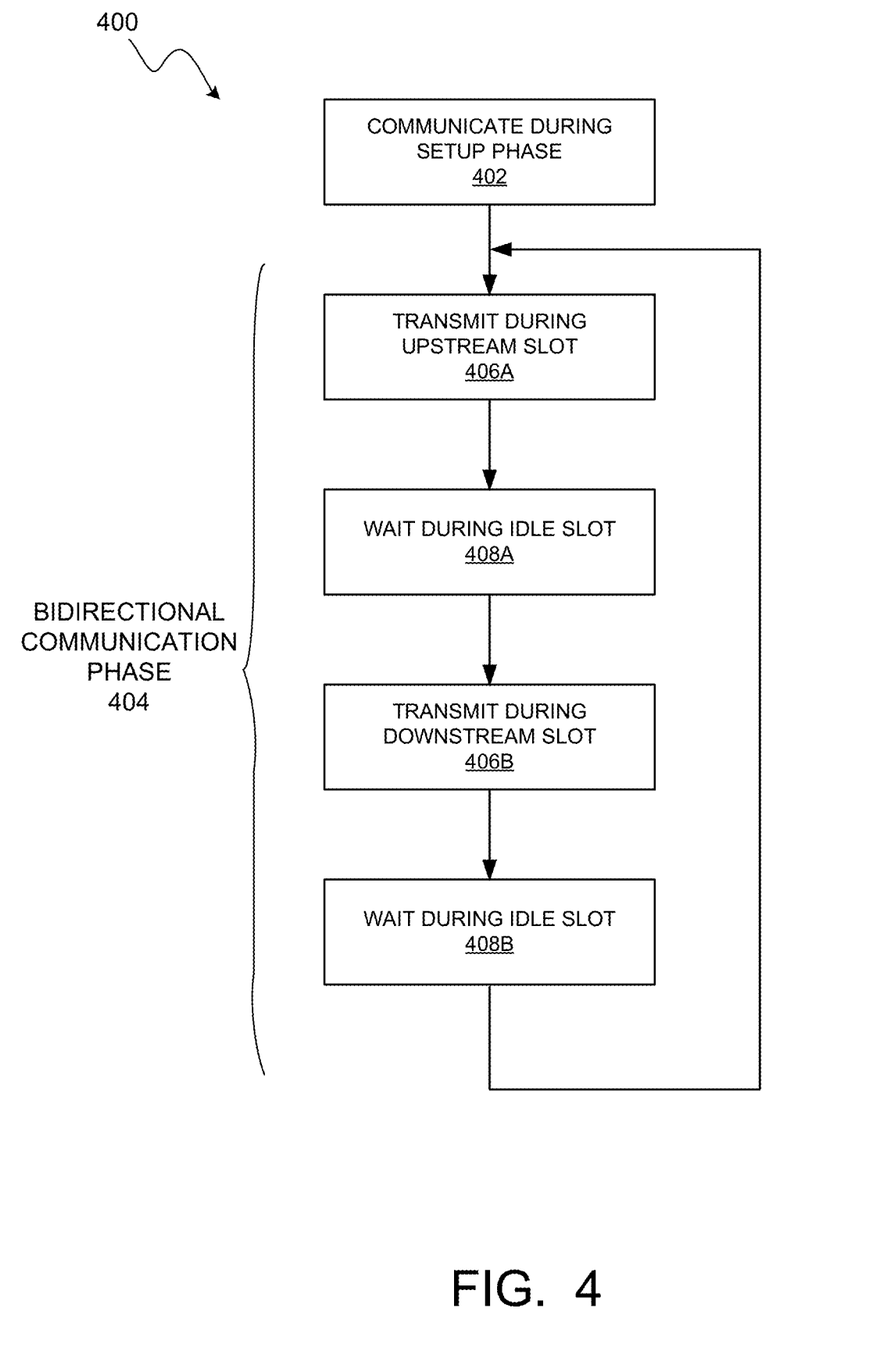
FIG. 4 is a flowchart of an example procedure for bidirectional communication in the communications network.

Referring to FIG. 4, an example of a procedure 400 for bidirectionally transmitting data between transceivers over a transmission line, as described herein. The procedure 400 includes communicating between a first transceiver and a second transceiver during a setup phase 402 in which information is exchanged between the first transceiver and the second transceiver (e.g., according to the MAC layer). The information exchanged includes a value indicating relative durations of time slots (e.g., at least one of a selected time duration of upstream time slots or downstream time slots, or a selected time slot ratio between upstream time slots and downstream time slots). The procedure 400 includes communicating between the first transceiver and the second transceiver during a bidirectional communication phase 404 within time slots determined according to the value. The time slots include upstream time slots in which the first transceiver transmits (406A) data to the second transceiver, and downstream time slots in which second transceiver transmits (406B) data to the first transceiver. In some cases, the downstream time slots are shorter than the upstream time slots. There are also idle time slots separating adjacent upstream and downstream time slots during which both transceivers wait (408A) after upstream timeslots and wait (408B) after downstream time slots, without transmitting over the transmission line. At any point after any number of rounds of the communication phase 404, such as after a given amount of sensor data has been sent, the MAC layer can terminate the communication session between the transceivers.

The techniques described herein can be implemented in a manner that is compatible with any of a variety of types of protocols, including protocol(s) used in a PHY layer, a MAC sublayer, or both, such as an Ethernet protocol, or any other protocol that facilitates bidirectional communication over a shared communication medium used for a point-to-point link. The transmission line can be implemented using any of a variety of types of cables, which may be selected to have suitable characteristics (e.g., shielding, grounding) for a variety of constrained environments. For example, a signal can be transmitted as a voltage between a pair of wires in a single-ended configuration in which one wire is grounded and the other wire carries a voltage with respect to the ground wire to yield a desired voltage signal, or in a differential configuration in which both wires carry complementary voltages whose difference yields a desired voltage signal.

While the disclosure has been described in connection with certain embodiments, it is noted that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A networking system for bidirectionally transmitting data, comprising:
  a communication medium comprising a transmission line having a first end and a second end;
  a first node comprising a first transceiver coupled to the transmission line in proximity to the first end through a first bidirectional interface that is configured to transmit electromagnetic signals to the transmission line and receive electromagnetic signals from the transmission line during a bidirectional communication phase, the first transceiver being coupled to the transmission line over a connection that does not include echo cancellation circuitry; and a second node comprising a second transceiver coupled to the transmission line in proximity to the second end through a second bidirectional interface that is configured to transmit electromagnetic signals to the transmission line and receive electromagnetic signals from the transmission line during the bidirectional communication phase, the second transceiver being coupled to the transmission line over a connection that does not include echo cancellation circuitry;

wherein the first node and the second node are configured to communicate during the bidirectional communication phase such that:

the first node is configured to control the first transceiver to transmit data to the second transceiver over the transmission line during a plurality of upstream time slots of a first length, the second node is configured to control the second transceiver to transmit data to the first transceiver over the transmission line during a plurality of downstream time slots of a second length shorter than the first length, and adjacent upstream and downstream timeslots are separated by respective idle time slots.

2. The networking system of claim 1, wherein:
the first node further comprises:
a port configured to provide collected data from a sensor, and
a first medium access controller configured to control timing of access by the first transceiver to the transmission line during the bidirectional communication phase; and
the second node further comprises a second medium access controller configured to control timing of access by the second transceiver to the transmission line during the bidirectional communication phase.

3. The networking system of claim 2, further comprising the sensor, in communication with the port of the first node, and configured to collect at least a portion of the collected data during the bidirectional communication phase.

4. The networking system of claim 2, wherein, during a plurality of the upstream time slots, the first transceiver transmits data that includes at least some of the collected data to the second transceiver.

5. The networking system of claim 2, wherein the first and second medium access controllers are configured to provide a minimum duration of the idle time slots based at least in part on a termination characteristic of the transmission line.

6. The networking system of claim 5, wherein the first end is terminated with an impedance configured to reduce reflections from the first end by at least 80%, and the second end is terminated with an impedance configured to reduce reflections from the second end by at least 80%.

7. The networking system of claim 6, wherein the first and second medium access controllers are configured to provide the minimum duration to be long enough for a reflection from the first end or second end to propagate over a round trip between the first end and second end at least twice.

8. The networking system of claim 2, wherein the first medium access controller and the second medium access controller are configured to exchange information by the first transceiver and the second transceiver, respectively, during a setup phase, and the setup phase includes transmitting between the second node and the first node a value indicating at least one of: a selected time duration of the upstream time slots or the downstream time slots, or a selected time slot ratio between the upstream time slots and the downstream time slots.

9. The networking system of claim 8, wherein the first node includes a first timing module configured to provide a first timing signal for determining time slots in which to transmit and receive using the first transceiver, and the second node includes a second timing module configured to provide a second timing signal for determining time slots in which to transmit and receive using the second transceiver.

10. The networking system of claim 9, wherein the first node and the second node are configured to synchronize the first timing module to the second timing module during the setup phase.

11. The networking system of claim 2, wherein the second node further comprises a communication port that is in communication with a computing device configured to process at least a portion of the collected data.

12. The networking system of claim 11, wherein the second node comprises a networking switch configured to route at least a portion of the collected data to the computing device.

13. The networking system of claim 2, wherein the first medium access controller and the second medium access controller are configured to provide a communication session in which all downstream time slots have the same duration, and all the upstream time slots have the same duration.

14. A vehicle in which the networking system of claim 1 is configured to transmit data between devices disposed in different portions of the vehicle.

15. The networking system of claim 1, wherein the first node and the second node are configured to wait during the idle timeslots without transmitting over the transmission line.

16. The networking system of claim 1, wherein the first node and the second node are configured to provide the idle time slots that each span an entire duration between their respective adjacent upstream and downstream time slots.

17. The networking system of claim 1, wherein the first and second nodes are configured to provide a minimum duration of the idle time slots to be long enough for a reflection of an electromagnetic signal transmitted in an upstream or downstream time slot to propagate between the first and second ends enough times to fall to a low enough amplitude to avoid significant distortion.

18. The networking system of claim 17, wherein the reflection of the electromagnetic signal propagating between the first and second ends enough times to fall to a low enough amplitude to avoid significant distortion comprises propagating over a round trip between the first end and the second end at least twice.

19. A method for bidirectionally transmitting data between a first transceiver and a second transceiver over a transmission line through respective bidirectional interfaces that transmit electromagnetic signals to the transmission line and receive electromagnetic signals from the transmission line, the method comprising:

communicating between the first transceiver and the second transceiver during a setup phase in which information is exchanged between the first transceiver and the second transceiver, the information including a value indicating at least one of: a selected time duration of upstream time slots or downstream time slots, or a selected time slot ratio between upstream time slots and downstream time slots; and communicating between the first transceiver and the second transceiver during a bidirectional communication phase within time slots determined according to the value, the communicating during the bidirectional communication phase including:
- transmitting data from the first transceiver transmits to the second transceiver over the transmission line during a plurality of upstream time slots of a first length,
- transmitting data from second transceiver transmits to the first transceiver over the transmission line during a plurality of downstream time slots of a second length shorter than the first length, and
- waiting during a plurality of idle time slots separating adjacent upstream and downstream time slots without performing echo cancellation on electromagnetic signals at either end of the transmission line.

20. The method of claim 19, further comprising receiving collected data through a port of a first node that includes the first transceiver.

21. The method of claim 20, further comprising, during a plurality of the upstream time slots, transmitting data that includes at least some of the collected data from the first transceiver to the second transceiver.

22. The method of claim 19, wherein communicating between the first transceiver and the second transceiver during the bidirectional communication phase includes waiting during the idle time slots for a minimum duration of the idle time slots that is long enough for a reflection from a first end or second end of the transmission line to propagate over a round trip between the first end and the second end at least twice.

23. The method of claim 19, further comprising, during the setup phase, synchronizing a first timing signal for determining time slots in which to transmit and receive using the first transceiver, and a second timing signal for determining time slots in which to transmit and receive using the second transceiver.

24. The method of claim 23, wherein the synchronizing comprises locking the second timing signal to the first timing signal.

25. The method of claim 19, wherein communicating between the first transceiver and the second transceiver during the bidirectional communication phase includes waiting during the idle time slots without transmitting over the transmission line.

26. The method of claim 19, wherein communicating between the first transceiver and the second transceiver during the bidirectional communication phase includes waiting during the idle time slots that each span an entire duration between their respective adjacent upstream and downstream time slots.

27. The method of claim 19, wherein receiving data transmitted from the first transceiver to the second transceiver during at least one upstream time slot includes receiving electromagnetic signals from the transmission line without performing echo cancellation on the received electromagnetic signals, and receiving data transmitted from the second transceiver to the second transceiver during at least one downstream time slot includes receiving electromagnetic signals from the transmission line without performing echo cancellation on the received electromagnetic signals.

* * * * *